US 6,645,308 B2

(12) United States Patent
Wong et al.

(10) Patent No.: US 6,645,308 B2
(45) Date of Patent: Nov. 11, 2003

(54) POLISH CLEANING APPARATUS AND METHOD IN MANUFACTURE OF HGA

(75) Inventors: Mingbing Wong, Xianyou (CN); Fuhong Yu, Tuen Mun (CN); Liang Qian, Dongguan (CN); Feng Xie, Fuchow (CN)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 156 days.

(21) Appl. No.: 09/810,833

(22) Filed: Mar. 16, 2001

(65) Prior Publication Data

US 2001/0030171 A1 Oct. 18, 2001

(30) Foreign Application Priority Data

Apr. 13, 2000 (WO) ........................... CN00/00089

(51) Int. Cl.$^7$ ................................ B08B 7/04
(52) U.S. Cl. .................. 134/6; 134/7; 134/26; 134/29; 134/34; 134/42; 451/28; 451/66; 15/93.1; 360/128; 360/235.1; 216/52; 216/53; 216/83
(58) Field of Search .................... 134/6, 7, 26, 34, 134/42, 29; 451/28, 66; 360/128, 235.1; 15/97.1; 216/52, 53, 83

(56) References Cited

U.S. PATENT DOCUMENTS

| | | | |
|---|---|---|---|
| 4,183,819 A | 1/1980 | Stolove | 252/144 |
| 4,663,686 A * | 5/1987 | Freeman et al. | 360/128 |
| 5,486,970 A | 1/1996 | Lee et al. | 360/128 |
| 5,543,179 A | 8/1996 | Nouchi et al. | 427/346 |
| 5,850,321 A * | 12/1998 | McNeil et al. | 360/246.2 |
| 6,084,753 A * | 7/2000 | Gillis et al. | 360/128 |
| 6,217,425 B1 | 4/2001 | Shindou et al. | 451/259 |
| 6,278,582 B1 * | 8/2001 | Okawa et al. | 360/235.2 |
| 2001/0030171 A1 * | 10/2001 | Wong et al. | 216/52 |

FOREIGN PATENT DOCUMENTS

| | | | | |
|---|---|---|---|---|
| JP | 62067745 | | 3/1987 | G11B/9/06 |
| JP | 2000173030 | * | 6/2000 | |
| RU | 442119 A | * | 2/2001 | |
| US | 2001/0030171 A1 | * | 10/2001 | |
| WO | WO 82/00731 | | 3/1982 | G11B/5/41 |

* cited by examiner

Primary Examiner—Sharidan Carrillo
(74) Attorney, Agent, or Firm—Kenyon & Kenyon

(57) ABSTRACT

A method and apparatus for cleaning the slider air bearing surface of a head gimbal assembly is disclosed. A plurality of carriers may position and hold a plurality of head gimbal assemblies to be polished. A cloth strip may be rubbed against the slider air bearing surface. A movable cylinder unit coupled to the plurality of carriers may move the carriers. A polish tank may provide cleaning solution to the movable cylinder unit. A pump may recirculate the cleaning solution. A filter canister with a filter cartridge may filter the cleaning solution.

6 Claims, 2 Drawing Sheets

POLISH CLEANING APPARATUS AND METHOD IN MANUFACTURE OF HGA

FIELD OF THE INVENTION

The present invention relates generally to a cleaning and polishing apparatus and method used in the disk drive industry. More specifically, the present invention relates to a cleaning and polishing apparatus and method used in the manufacture of a head gimbal assembly.

BACKGROUND OF THE INVENTION

Thin film heads are used for reading or writing data onto a recording layer of a data storage disk. Typically, the head "flies" above the surface of the disk at a very low "altitude". The height of the air gap between the head and the disk is usually measured in fractions of a micron. The low height of the air gap causes an air bearing to be formed.

For a disk that stores data using magnetic effects, the head usually includes a radio frequency coil for transmitting and receiving a magnetic field to write and read in the recording layer. For disks that store data using optical effects, the head may include an objective lens to focus a light beam at the recording layer.

Along with the evolution of the disk industry, the surface cleanliness of read-write heads has become one of the most critical concerns. With low-flying heads, dust in the environment is a serious problem. Dust particles can cause catastrophic "head crashes" destroying the head and disk. Also, significant amounts of dust can accumulate on the head to interfere with the magnetic or optical effects. Contaminants may cause a disk driver to malfunction or even fail to spin up.

Classical wash, rinse and dry technology using an aqueous chemical substance and ultrasonic agitation can not provide adequate cleaning efficiency for a head's air bearing surface. More effective contamination removal methods to ensure that components and drives always remain as clean as possible are needed.

U.S. Pat. No. 5,467,238 issued to Neville K. Lee et al on Nov. 14, 1995, disclosed a cleaning apparatus for cleaning read/write heads used for accessing data stored on a recording disk of a disk drive. The cleaning apparatus had a mounting base positioned adjacent to the disk. The base includes a ratchet mechanism for rotating a cleaning pad mounted thereon. The rotary or linear actuator arm used to position the read/write head activates the ratchet mechanism. The ratchet mechanism rotates the cleaning pad while the actuator unloads the read/write head from the disk. A loading ramp is used to vertically position the read/write head relative to a cleaning surface of the cleaning pad. This conventional cleaning apparatus is more complicated in structure, lower in efficiency, and is used only after assembly of a disk drive, making it unsuitable for use in the mass production of the heads.

SUMMARY OF THE INVENTION

A new kind of cleaning and polishing apparatus and method for cleaning the heads of a head gimbal assembly to eliminate contamination of the heads by dusts or particulates is disclosed. In accordance with one aspect of the present invention, a cleaning and polishing apparatus for cleaning a head of a head gimbal assembly (HGA) may have a frame, a plurality of carriers for locating and holding a plurality of HGAs, a plurality of polish fingers under the carriers and fixed on a loading base, a cloth attached to said polish fingers, and a plurality of press-pins on each of the carriers. The HGAs may have a face and a slider with an air-bearing surface (ABS) to be polished and directed downwards. The cloth may act as a polish medium to provide a plurality of polish surfaces on which the HGAs are polished and cleaned. The press pins press on a HGA's flexure to provide proper friction between the slider ABS and the polish surface.

According to another embodiment, a pneumatic cylinder unit is combined with the carriers. The pneumatic cylinder unit, controlled by a programmable controller, may move the carriers, as well as the plurality of HGAs. The pneumatic cylinder unit may move back and forth in X and Y directions according to a customized program. The solution may be sufficiently agitated by the motion of a cylinder unit to promote dissolution action. Also, a polish tank containing a cleaning solution, may be provided on the top of the frame. The cleaning solution is recirculated through a pump and a filter canister with an effective filter cartridge. The filter canister may filter off the insoluble, suspended contaminants and particles in the solution so that the slider ABS will not be re-contaminated. A thermostatically controlled strip heater may heat the solution to a desired working temperature. The contaminants may be scrubbed off into the solution through solubilization, emulsification, chemical action by a detergent, etc. The temperature, kind, and concentration of the chemical substance of said solution may be selected to achieve maximum cleaning effectiveness. The apparatus and method of the invention is suitable for the removal of dusts, oils, fingerprints, and other organic and inorganic contaminants in the form of both particulate and thin-film.

BRIEF DESCRIPTION OF THE DRAWINGS

The above and other objects and advantages of the present invention will be described by way of preferred embodiments and with reference to the drawings, in which.

DETAILED DESCRIPTION

The head gimbal assembly (HGA) is a precision component in a disk drive. The conventional ultrasonic cleaning can cause mechanical damage under high ultrasonic power, which limits its application, and can not provide an adequate cleaning effect. However, the new polish cleaning technology can effectively clean the head and does not cause side effects for HGA performance. Basically, the polish cleaning can remove all kinds of contaminants such as dust, particles, film, etc. Its removal efficiency can achieve up to 95% for all kinds of contaminants whether it's organic or inorganic, while the classical ultrasonic cleaning does only about 60% for small particles and is not efficient for other kinds of contaminants.

Figure 1:
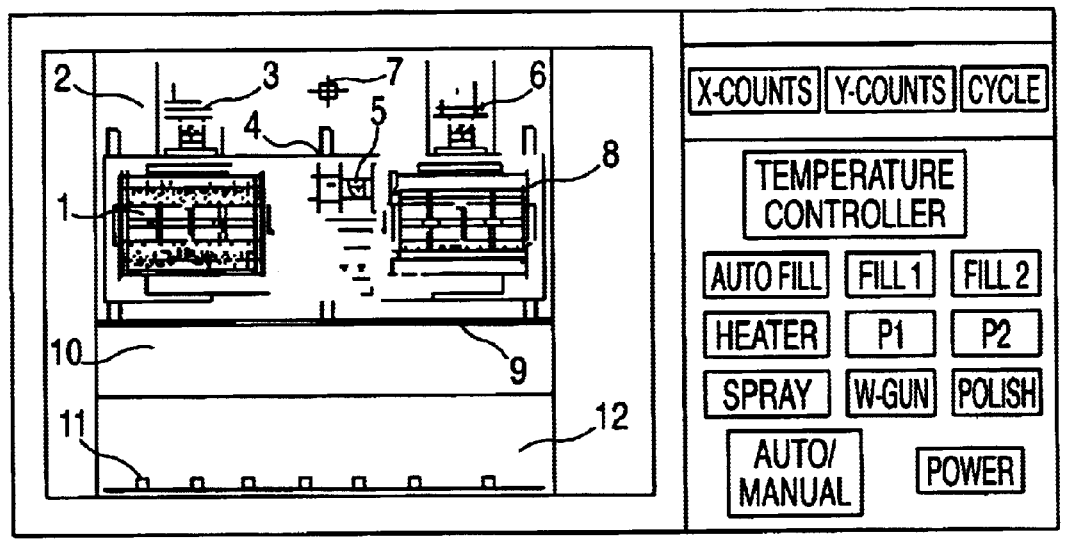
FIG. 1 is a top view of the polish cleaning apparatus of the present invention.
Figure 2:
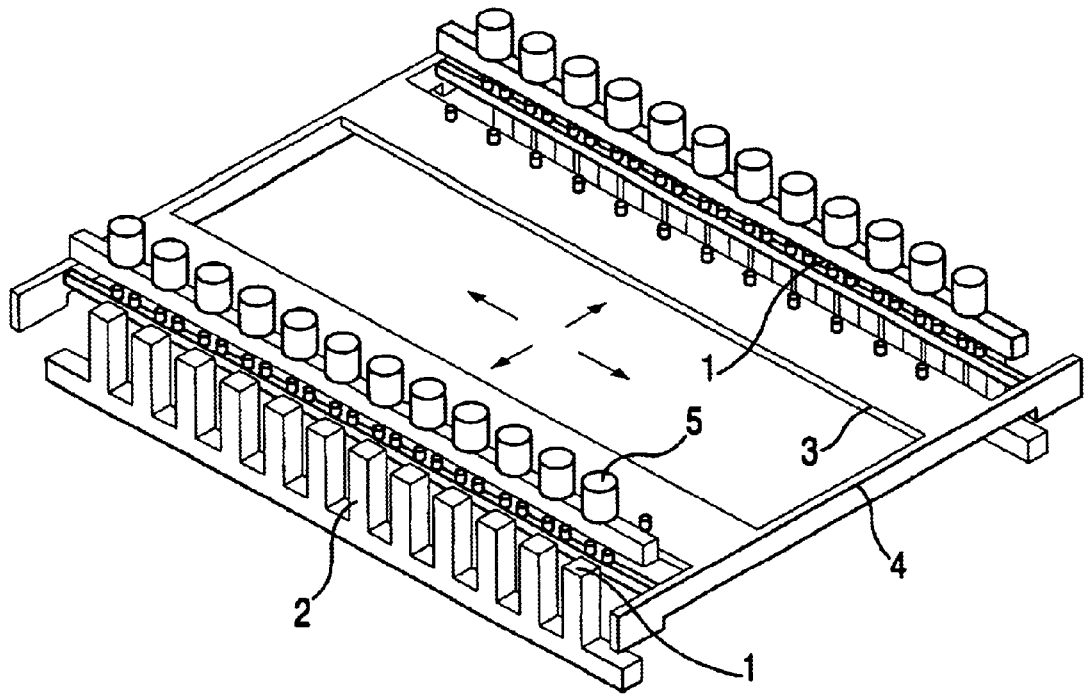
FIG. 2 is a perspective view of an HGA carrier positioned on polish fingers in the polish cleaning apparatus of the present invention.
Figure 3:
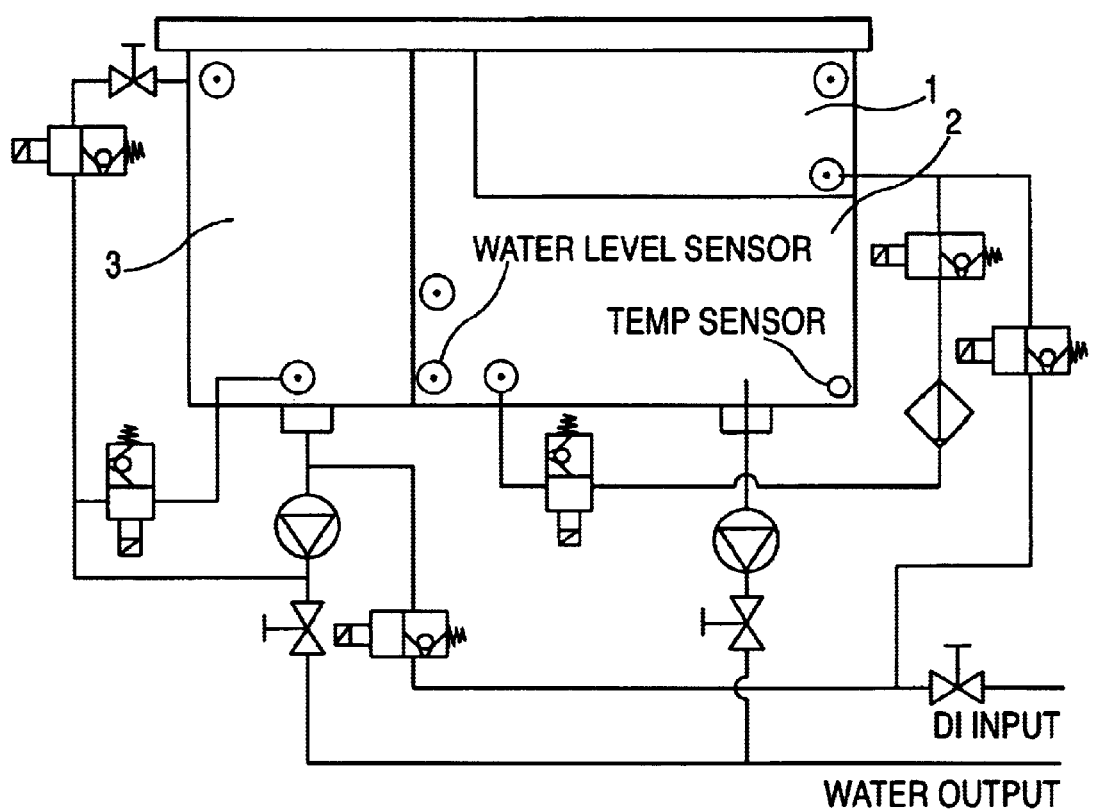
FIG. 3 is a diagram of water circulation of the polish cleaning apparatus.

As shown in FIGS. 1–3, one embodiment of a polishing and cleaning apparatus of the present invention may have polish fingers, HGA carriers, a cylinder motion unit and an immersion polish tank.

In one embodiment of the present invention, the polishing and cleaning method may be a contact-cleaning process using a type of polyester cloth. The polyester cloth has good anti-static properties having less particles or even being particle-free and has good wear durability as a cleaning medium. A pneumatic cylinder unit may bring the HGA being polished and cleaned into the cleaning area. The pneumatic cylinder unit may move back and forth in both X and Y directions on a cloth-strip wrapped onto a set of polish fingers. The slider air bearing surface (ABS) is polished with a much higher cleaning efficiency (nearly 90%), as shown in FIG. 1.

In one embodiment illustrated by FIG. 2, cleaning units 1 and 8 may have two rows of polish fingers 2. On these two rows of polish fingers 2, a kind of anti-static polyester cloth-strip is fixed smoothly by tension force to form a polish cleaning surface. A plurality of HGAs 1 may be positioned on the cleaning surface to be cleaned and polished effectively.

The HGA carriers hold a plurality of HGAs 1. The HGA carriers also position the plurality of HGA 1 by the co-ordination of the carriers and polish fingers, see FIG. 2. The HGA carriers may have a plurality of cylindrical pressing pins to press on a HGA's flexure. The HGA carriers may move back and forth according to a computer program for substantially simultaneous polishing and cleaning.

In one embodiment, the cylinder motion units may each comprise an X-cylinder 4, 5 and a Y-cylinder 3, 6. The X-cylinder 4, 5 and Y-cylinder 3, 6 move back and forth in X or Y direction, according to a computer program customized in advance, and cause HGA carriers as well as the plurality of HGAs to move in both X and Y directions repeatedly.

In one embodiment illustrated in FIG. 3, the HGA carriers containing the HGAs may be immersed into a polish tank containing a solution so that the HGAs can be cleaned and polished. The tank may have an overflow weir, a pump, and a filter canister. The filter canister may have a 0.2 micron filter cartridge for solution recirculating and filtering. The tank may also have a thermostatically controlled strip heater to heat the solution to a proper working temperature.

The cleaning function may have chemical and physical actions, as well as the polish cleaning. A cloth scrubbing action may be performed first. The moving cloth strip scrubs off contaminants on the dirty slider surface being cleaned. This action smashes the mass contaminants into tiny pieces.

The detergent dissolution action may be performed second. The contaminants scrubbed off may be placed into solution through solubilization, emulsification, chemical action by a detergent, etc. As in a conventional cleaning process, time, temperature, and kind and concentration of the detergent may be important parameters in achieving maximum cleaning effectiveness. Motion of the cylinder may provide sufficient agitation to promote dissolution action.

The filtration action may be performed third. A filter canister may filter off the insoluble, suspended contaminants and particles in solution in time. Otherwise, they may recontaminate the products so that the latter must be cleaned again.

While the present invention has been described by way of the preferred embodiments, the foregoing described is in all aspects illustrative, not restrictive. It is obvious to a person skilled in this art that numerous variations and modifications can be devised without departure from the scope of the invention.

What is claimed is:

1. A cleaning method for cleaning an HGA (head gimbal assembly) comprising:

precisely positioning and holding in a carrier a plurality of head gimbal assemblies each with a slider air bearing surface to be polished;

moving a cloth strip on the slider air bearing surface to scrub off any contaminants;

immersing the carrier into a cylinder unit filled with a solution to collect said contaminants into the solution;

agitating said solution by motion of the cylinder unit to promote dissolution of said contaminants; and filtering off insoluble, suspended contaminants and particles in said solution by a filter canister.

2. The cleaning method of claim 1, wherein the solution is a detergent.

3. The cleaning method of claim 1, further comprising heating the solution with a thermostatically controlled strip heater.

4. The cleaning method of claim 1, further comprising pressing the slider air bearing surface of the head gimbal assemblies into the cloth strip by applying pressure to a flexure of the head gimbal assemblies with a series of press-pins.

5. The cleaning method of claim 1, wherein the cloth strip is wrapped on a plurality of polish fingers.

6. The cleaning method of claim 1, wherein the cylinder unit is pneumatic.

* * * * *